United States Patent
Lang

(10) Patent No.: US 11,718,301 B2
(45) Date of Patent: Aug. 8, 2023

(54) METHOD FOR OPERATING A MOTOR VEHICLE COMPRISING A POWER TAKE-OFF UNIT

(71) Applicant: ZF Friedrichshafen AG, Friedrichshafen (DE)

(72) Inventor: Ulf Lang, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/546,591

(22) Filed: Dec. 9, 2021

(65) Prior Publication Data
US 2022/0185286 A1    Jun. 16, 2022

(30) Foreign Application Priority Data
Dec. 10, 2020   (DE) .................. 10 2020 215 661.1

(51) Int. Cl.
*B60W 10/11*   (2012.01)
*B60W 30/188*  (2012.01)
(Continued)

(52) U.S. Cl.
CPC ........ *B60W 30/1888* (2013.01); *B60W 10/02* (2013.01); *B60W 10/04* (2013.01); *B60W 10/11* (2013.01); *B60W 2300/15* (2013.01); *B60W 2710/021* (2013.01); *B60W 2710/0644* (2013.01); *B60W 2710/0677* (2013.01); *B60W 2710/081* (2013.01); *B60W 2710/086* (2013.01);
(Continued)

(58) Field of Classification Search
CPC .. B60W 30/1888; B60W 10/02; B60W 10/04; B60W 10/11; B60W 2300/15; B60W 2710/021; B60W 2710/0644; B60W 2710/0677; B60W 2710/081; B60W 2710/30; B60W 2710/1077; B60W 2710/1088; F16D 2500/10437; F16D 48/02
USPC .......................................... 477/79, 156, 158
See application file for complete search history.

(56) References Cited

U.S. PATENT DOCUMENTS

| | | | |
|---|---|---|---|
| 5,778,329 A | 7/1998 | Officer et al. | |
| 6,564,915 B2* | 5/2003 | Lorentz | A01B 71/063 |
| | | | 192/109 F |

(Continued)

FOREIGN PATENT DOCUMENTS

| | | |
|---|---|---|
| DE | 10 2008 040 757 A1 | 8/2000 |
| DE | 100 05 753 A1 | 2/2008 |
| EP | 1 912 842 B1 | 10/2013 |

*Primary Examiner* — Roger L Pang
(74) *Attorney, Agent, or Firm* — Finch & Maloney PLLC

(57) ABSTRACT

A method of operating a motor vehicle. A request for coupling a power take-off is detected. It is checked (12) whether relevant boundary conditions for coupling the power take-off are fulfilled. If the boundary conditions are fulfilled, a system pressure for actuating the power take-off clutch is built up (16). It is checked (18) whether sufficient system pressure to actuate the power take-off clutch has been built up. When sufficient system pressure has sufficiently been built up, a confirmation signal is produced (20). In reaction to the confirmation signal, a driving transmission control unit is modified (34) in order to actuate the at least one shifting element of the driving transmission with a higher actuation pressure than with an unmodified driving transmission control unit.

12 Claims, 1 Drawing Sheet

(51) Int. Cl.
*B60W 10/02* (2006.01)
*B60W 10/04* (2006.01)

(52) U.S. Cl.
CPC .............. *B60W 2710/1005* (2013.01); *B60W 2710/1011* (2013.01); *B60W 2710/1022* (2013.01); *B60W 2710/1083* (2013.01)

(56) References Cited

U.S. PATENT DOCUMENTS

| | | |
|---|---|---|
| 2010/0022348 A1 | 1/2010 | Jonsson |
| 2016/0025211 A1* | 1/2016 | Schaefer ................ F16H 61/12 701/58 |
| 2017/0240159 A1* | 8/2017 | Foster .................. F16D 48/066 |
| 2018/0180179 A1* | 6/2018 | Kawamoto ........... F16H 61/702 |

* cited by examiner

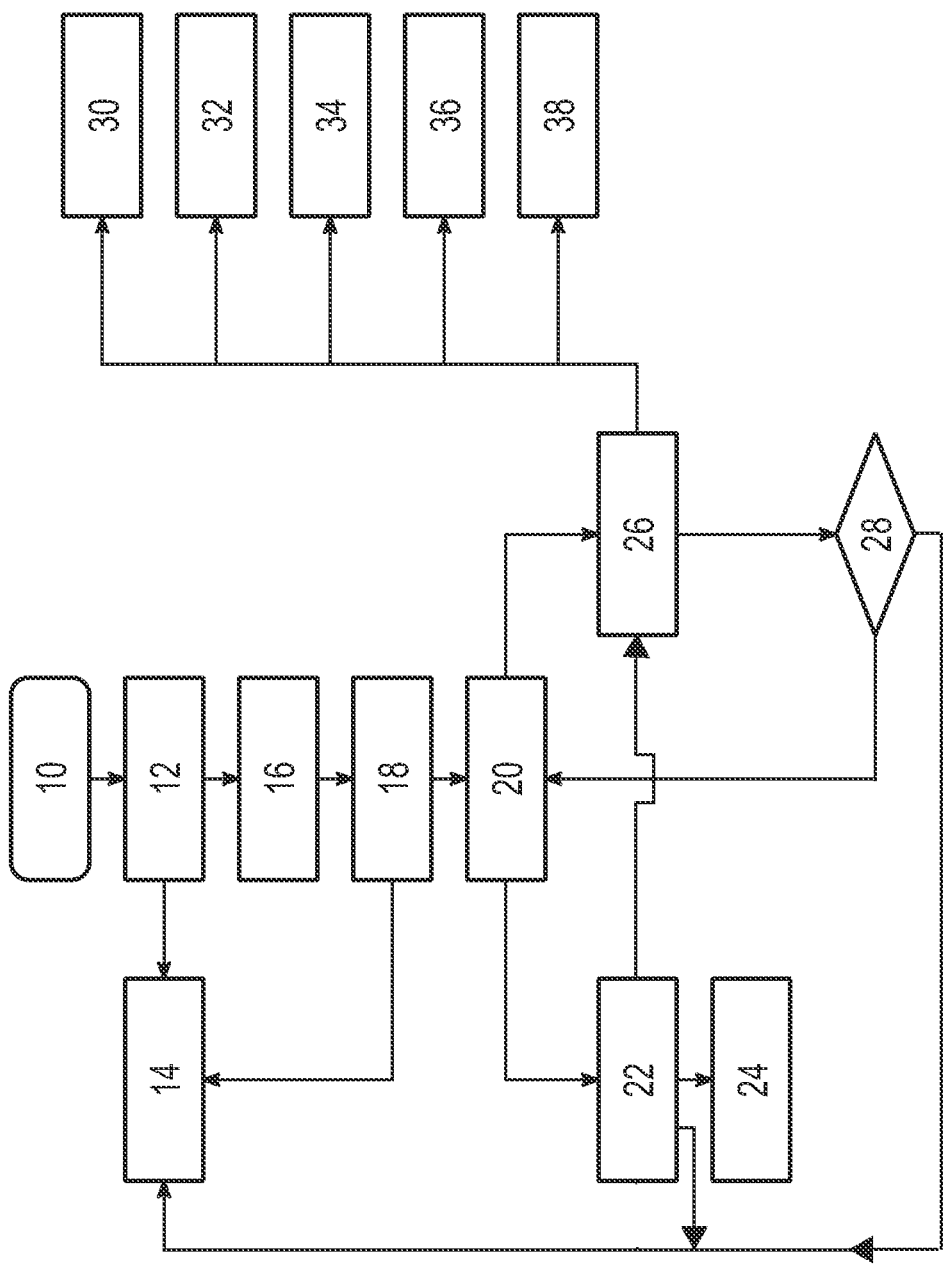

METHOD FOR OPERATING A MOTOR VEHICLE COMPRISING A POWER TAKE-OFF UNIT

This application claims priority from German Patent Application No. 10 2020 215 661.1 filed Dec. 10, 2020.

FIELD OF THE INVENTION

The present invention relates to a method for operating a motor vehicle with a power take-off. In addition, the invention relates to a control unit designed to carry out the method, and to a corresponding computer program for carrying out the method by means of the said control unit.

BACKGROUND OF THE INVENTION

Motor vehicles can not only power a drive input, with their motor, but also provide power for an auxiliary aggregate by way of a power take-off. For example, in the case of agricultural machines, such as tractors or combine harvesters, the motor also supplies power to respective working attachments as auxiliary aggregates. For example, a hydraulic pump can form the power take-off, which is driven in order to be able to use the working attachment such as a grinder or a scoop. The power take-off can be, for example, driven by a motor-side crankshaft of the motor or a power take-off shaft functionally connected thereto. If no power is called for from the power take-off, the power take-off can be decoupled, for example by means of a power take-off clutch, to increase the efficiency.

However, when the power take-off is fitted on the motor side it is driven at the rotation speed of the motor, which may be undesirable. For that reason, an additional transmission can be provided for the power take-off, but this incurs extra costs and occupies fitting space in the vehicle.

The power take-off can also be fitted on a transmission of the motor vehicle, which provides various driving ranges. In that case, the power take-off is not connected on the motor side but on the transmission side. In that way respective gear ratio steps of the transmission can be used to drive the power take-off for little cost and effort at a desired rotation speed. In this case too, the power take-off can be decoupled when not needed, in order to increase the efficiency. However, the operation of the power take-off and its previous coupling can give rise to interactions with the transmission and its control system.

EP 1 912 842 81 B1 describes a method for determining an additional load on a motor of a vehicle equipped with a power take-off shaft for powering an additional function, by periodically ramping down the pressure of a power take-off shaft clutch.

SUMMARY OF THE INVENTION

A first aspect relates to a method for operating a motor vehicle having a motor, a driving transmission with at least one shifting element. a power take-off, and a power take-off clutch by means of which the power take-off can be coupled to the driving transmission. The motor can be, for example, in the form of an electric motor or an internal combustion engine, and provides a drive power. The driving transmission can be designed to provide various drive ranges. For example, the driving transmission can transmit drive torque from the motor to the respective wheels of the motor vehicle by means of two or more gears each with a fixed gear ratio. The at least one shifting element can be, for example, in the form of a frictional clutch or an interlocking clutch. By means of the shifting element, a shift can be carried out, for example between two drive ranges. The shifting element is, for example, designed to be engaged hydraulically or by electro-mechanical means. The power take-off can serve to provide power to an auxiliary aggregate during driving. For example, the power take-off can comprise a hydraulic pump for building up hydraulic pressure in a hydraulic system of the auxiliary aggregate. The power take-off clutch can be, for example, a frictional or interlocking clutch. In an engaged condition, the power take-off clutch can enable torque to pass from the driving transmission to the power take-off. In a disengaged condition, the power take-off can be separated by the power take-off clutch from the driving transmission so that no drive torque is transmitted. The power take-off clutch can be, for example, actuated by hydraulic pressure or by a pressure built up by electro-mechanical means in order to change it from its disengaged condition to its engage condition. The pressure for actuating the power take-off clutch can be supplied by the driving transmission. For this, the driving transmission can be designed only to produce the pressure for actuating the power take-off clutch when necessary, i.e., when the use of the power take-off is called for.

The method can comprise a step of detecting a request to couple the power take-off. For example, when a driver of the motor vehicle actuates a corresponding shifting element a command signal is produced, which is transmitted via a CAN bus to a control unit that carries out the method, such as a driving transmission control unit, and alternatively or in addition to a microcontroller for its reception.

The method can comprise a step of checking whether relevant boundary conditions for coupling the power take-off are fulfilled. Such boundary conditions can be, for example, current vehicle parameters. Examples of boundary conditions are that the motor is operating, a drive input rotation speed is within a permissible range, a parking brake is actuated if the power take-off is a stationary one, a selector lever is in the N or P positions, again if the power take-off is a stationary one, a transmission oil temperature is within a permitted range, there are no relevant error messages, another power take-off is switched completely on or off, and the actuation signal is present and still valid. If the boundary conditions are not fulfilled, an error signal can be emitted, by virtue of which the operation of the power take-off is blocked. The boundary conditions can be checked until they are fulfilled or until the command to couple the power take-off is cancelled.

In a further step, a system pressure is built up sufficient to actuate the power take-off clutch if the respective boundary conditions are fulfilled. For this, for example a control signal can be emitted to a valve or a pump. The system pressure can be provided by the driving transmission. Correspondingly, the control signal can also be sent to a driving transmission control unit. An actuator of the power take-off clutch can be pressurized in such a manner that following this, actuation of the power take-off clutch, for example to engage it, is possible. The system pressure is only built up when necessary, since energy is required for its building up and maintenance, and otherwise the efficiency of the vehicle would decrease. The actuation of the power take-off clutch can result in its closure so that torque can be transmitted to the power take-off for the operation of the auxiliary aggregate.

The method can comprise a step of checking whether a sufficient system pressure for actuating the power take-off clutch has been built up. For this, for example, a pressure sensor can detect a pressure. The system pressure can be, for example, sufficient if it exceeds a threshold value. The threshold value can be constant, or alternatively, it can be determined as a function of an auxiliary aggregate connected to the power take-off and, alternatively or in addition, a required power-take-off power. In that way the threshold can be varied adaptively.

The method can comprise a step of producing a confirmation signal that the actuation of the power take-off clutch has taken place once sufficient system pressure has been built up. The confirmation signal can be, for example, produced by a control unit carrying out the method and alternatively or in addition by a microcontroller. The confirmation signal can be, for example, sent to a transmission control unit or a clutch control unit. By virtue of the confirmation signal the actuation of the power take-off clutch can be permitted. Thereby, the operation of the auxiliary aggregate can also be permitted. The confirmation signal can be, for example, sent via the CAN bus of the vehicle. The confirmation signal can be received by a transmission control unit. The method can also comprise a step of coupling the power take-off, i.e., engaging the power take-off clutch, when the confirmation signal is produced.

The method can comprise a step of modifying a driving transmission control unit in relation to the confirmation signal, in order to actuate the at least one shifting element of the driving transmission with a higher actuation pressure than if the driving transmission control unit had not been modified. The modification can take place directly in reaction to the confirmation signal, or also only when the power take-off clutch is actually engaged. For example, by virtue of the modification a control parameter in the driving transmission control unit can be changed. The change can be, for example, a positive offset. Thereby, the shifting element of the driving transmission concerned is engaged with a higher than usual actuation pressure. The usual actuation pressure can be a fixed value or else determined as a function of particular vehicle parameters such as a driving speed. The usual actuation pressure can already take into account that owing to the take-up of power by the power take-off, lower input torques may be available. In calculating the input torque, a power take-off torque characteristic, which for example has been programmed by a diagnosis section in the transmission control unit, is taken into account. With the said modification, the actuation pressures for shifting several or all the shifting elements of the driving transmission, in particular the respective frictional shifting elements of the driving transmission, can be increased. The modified and therefore higher actuating pressure can for example only actually be used when the shifting element concerned is also actually actuated, or has already been actuated, i.e., for example when it should be changed to its engaged condition or is already in that condition. The idea of this step is that owing to the load on the power take-off, the loads on the driving transmission and its shifting elements change rapidly and, alternatively or in addition, can be higher than current measurement values and vehicle parameters would indicate during operation without the power take-off being coupled or even having regard to the said power take-off torque characteristic, by means of which the shifting elements of the driving transmission are otherwise controlled. If the actuation pressure were not to be changed by the driving transmission control unit, the shifting elements concerned would slip to an unacceptably great extent and might even be mechanically damaged. This is counteracted by modifying the respective actuation pressures.

In an embodiment of the method, it can be provided that when the driving transmission control unit is modified, a learning function for an actuation pressure when actuating the at least one shifting element of the driving transmission is deactivated. For example, the learning function continuously adapts an actuation pressure. The driving transmission control unit can, for example, learn where a biting point is in a shifting element, and adapt the shifting element actuation thereto. Correspondingly, for example respective ramps for an actuation pressure control can be changed. The learning function can compensate tolerances and wear in the shifting element. However, due to the coupled power take-off certain input variables, such as a shifting element slip, can become no longer valid. The coupled power take-off can then act with an unknown variable. In that way an erroneous learning effect in the driving transmission control unit can be avoided. The learning function can serve for the fine adjustment of the actuations of particular clutches in the transmission. When the power take-off is in operation, the assumed input torques can sometimes be too imprecise for proper fine adjustment. Correspondingly, an incorrect fine adjustment is then avoided.

In an embodiment of the method, it can be provided that in reaction to the confirmation signal, a motor control unit is modified in at least one function. The function can be a calculation formula or other method for the parameterization of a vehicle control system, in particular a motor control system. In this context a function can be the specification of at least one rotation speed limit for the motor. For example, a fixed rotation speed limit can be reduced or such a rotation speed limit can be specified for the first time. In that way, for example an unacceptably high or low rotation speed of the power take-off can be avoided. The rotation speed limit can comprise a maximum rotation speed and alternatively or in addition a minimum rotation speed. Another function here, can be the specification of a limit on the power drawn from the motor. In this way an overload, for example of the driving transmission or the power take-off, or undesired stalling of the motor can be reliably avoided, even when the power take-up by the power take-off is varying greatly. The power take-up limit can comprise a maximum value and alternatively or in addition a minimum value. The motor and its power delivery can be controlled in accordance with those limits. Even mechanical overloading of the drive-train due to the coupled power take-off can be prevented by motor intervention initiated by the said at least one function.

In an embodiment of the method, it can be provided that when the transmission control unit is modified, in addition a different shifting program for the driving transmission is activated. For example, the shifting program can determine when, as a function of the driving speed and the motor rotation speed, particular shifting elements are shifted, for example in order to change the driving range. The transmission control unit can also contain a plurality of shifting programs, which can be, for example, selected by a driver. One or all of these shifting programs can be replaced by one or more modified corresponding shifting programs at least for the time during which the power take-off clutch is engaged, and alternatively or in addition for the time during which the system pressure that suffices for the actuation of the power take-off clutch has been built up. For example, due to the new shifting program a shift can be carried out at higher rotation speeds, since due to the power taken up by the power take-off less torque may be available for driving the vehicle. The respectively modified shifting programs can be activated directly in reaction to the confirmation signal, or only when the power take-off clutch is actually engaged.

In an embodiment of the method, it can be provided that a check is carried out to see whether, after the confirmation signal has been produced, the power take-off has been coupled within a predetermined time. If the power take-off has not been coupled within the said predetermined time, the system pressure can be reduced and the confirmation signal cancelled. For example, the pressure can be reduced to a previous initial pressure. For example, a signal can be emitted that the confirmation signal is no longer valid and, alternatively or in addition, the emission of the confirmation signal can be cancelled. This can prevent the motor vehicle from being operated less efficiently owing to an elevated system pressure even though the power take-off should no longer be coupled, for example due to an inadvertent erroneous actuation by the driver. Likewise, the system pressure can also be reduced after the power take-off has been deactivated or the power take-off clutch has been disengaged. In that case too, the confirmation signal can be cancelled.

In an embodiment of the method, it can be provided that after the power take-off has been decoupled, it is checked whether the respective boundary conditions for re-coupling the power take-off are still fulfilled. The check can be, for example, repeated intermittently or carried out continuously. If the respective boundary conditions at the time when the power take-off is decoupled are no longer fulfilled, the confirmation signal can be cancelled. Then, for example in reaction, the power take-off can be decoupled and, alternatively or in addition, the system pressure for actuating the power take-off clutch can be reduced.

In an embodiment of the method, it can be provided that the system pressure for actuating the power take-off clutch is maintained even after the confirmation signal has been cancelled, at least until the power take-off has been decoupled. In particular the system pressure can be maintained if the power take-off clutch is still engaged. In that way slipping at the power take-off clutch and decoupling of the power take-off during an unfavorable operating condition of the auxiliary aggregate can be avoided, even if the boundary conditions of the motor vehicle indicate that, at the time, the auxiliary aggregate should not be operating. The method can also include detection of the disengagement of the power take-off clutch. In reaction to the disengagement of the power take-off clutch detected, the system pressure can then be reduced even when there is no longer a confirmation signal.

In an embodiment of the method, it can be provided that when the driving transmission control system is modified in reaction to the confirmation signal, a value of the increase of the actuation pressure compared with an unmodified actuation pressure is determined as a function of at least one factor. An example of such a factor is a rotation speed applied at the drive input of the driving transmission. A further example of such a factor is a torque applied at the drive input of the driving transmission. For example, the increase of the actuation pressure can be obtained from a corresponding table. The factors can be, for example, calculated or measured. This enables an adaptive actuation pressure increase. Alternatively, the actuation pressure can be increased by a constant absolute or relative value.

In an embodiment of the method, it can be provided that an actual torque at a drive input of the driving transmission is calculated as a function of at least one of the following parameters:
- a torque delivered to the crankshaft of the motor;
- a consumer loss;
- a motor braking force when driving downhill; and
- a calculated torque applied at the power take-off.

This actual torque can then be used for controlling the driving transmission and alternatively or in addition for controlling the motor and alternatively or in addition for a power take-off control unit and, alternatively or in addition, for an auxiliary aggregate control unit. In that way precise control, as desired, can take place even when the power take-off is coupled. The consumer losses can be, for example, the power taken up by an air-conditioning unit or by an entertainment system of the motor vehicle. The torque applied in the power take-off is, for example, stored in its control unit as a characteristic.

In an embodiment of the method, it can be provided that a torque applied at the power take-off is calculated once in each case as a function of a characteristic of the power take-off and as a function of a converter slip, and if the torque calculated as a function of the converter slip is smaller, that torque is used for control purposes. This enables control of the driving transmission for example, or the determination of an offset for the modification of the actuation pressure, with a value closer to the actual value. A characteristic of the power take-off can be, for example, stored in the form of a table. The characteristic can be, for example, specified as a function of a rotation speed of the power take-off and a power of the power take-off. A converter is, for example, part of the power take-off or of the driving transmission. The converter can be designed for hydrodynamic torque transmission, or for the conversion of rotation energy into hydraulic pressure. The converter can be designed as a starting element for the auxiliary aggregate.

The invention also relates to a control unit designed to carry out the method according to the invention. The control unit comprises means that serve to carry out the method according to the invention. These means include hardware means and software means. The hardware means of the control unit are data interfaces in order to exchange data with the assemblies involved in carrying out the method. For this the control unit is connected with necessary sensors and, where necessary, also to other control units, in order to receive the decision-relevant data and pass on control commands. For example, the control unit can be designed as a transmission control unit. The hardware means of the control unit also include a processor for data processing and, if necessary, also a memory for data storage. The software means are program modules for carrying out the method according to the invention.

A computer program according to the invention is designed to enable a control unit to carry out the method according to the invention or a preferred further development thereof, when the computer program is run on the control unit. In this connection a computer-readable medium is also included in the object of the invention, on which medium a computer program as described above is stored and can be called up.

BRIEF DESCRIPTION OF THE DRAWING

The sole FIG. clearly but schematically illustrates, in the form of a flow chart, a method for operating a motor vehicle.

DETAILED DESCRIPTION OF THE PREFERRED EMBODIMENTS

The sole FIG. clearly but schematically illustrates, in the form of a flow chart, a method for operating a motor vehicle. The motor vehicle has a motor, a driving transmission with at least one shifting element, a power take-off and a power take-off clutch by means of which the power take-off can be connected to the driving transmission. The method can be, for example, provided in the form of a computer-implemented program product. For this, a corresponding software code and a non-volatile data carrier can be provided. The method can be, for example, implemented on a transmission control unit of the motor vehicle, which is connected to the CAN bus of the motor vehicle.

Step 10 is the start of the method. In step 10 a request to couple the power take-off is detected. For example, the driver of the motor vehicle can actuate a corresponding operating element whereby the transmission control unit receives an actuation signal.

In step 12, it is checked whether respective boundary conditions for coupling and if need be operating the power take-off are fulfilled. Example boundary conditions are that the motor is running, a drive input rotation speed is within an acceptable range, a parking brake is activated, if the power take-off is a stationary one, a selector lever is in N or P, if the power take-off is a stationary one, a transmission oil temperature is in the acceptable range, no relevant error messages are active, another power take-off is switched completely on or off, and the actuation signal is present and still valid.

If the check shows that respective boundary conditions are not fulfilled, step 14 follows. In step 14, a signal is generated to the effect that the operation is not permitted and, alternatively or in addition, a confirmation signal, which can be produced in step 20, is cancelled. If the power take-off clutch is not engaged, its engagement is blocked in step 14. Since step 14 was reached from step 12, this signal or the cancellation of the confirmation signal can be supplemented by the information that some, or even which particular, boundary conditions are not fulfilled.

If the said check shows that the respective boundary conditions are fulfilled, this is followed by step 16. In step 16, a system pressure sufficient to actuate the power take-off clutch is built up. For this, a corresponding control signal to open a valve, for example, is produced.

In step 18, it is checked whether a system pressure sufficient to actuate the power take-off clutch has been built up. That check can take place after a predetermined time interval following the beginning of the pressure build-up in step 16, so that in the event of a fault, the method can be interrupted and, alternatively or in addition, a corresponding signal can be emitted. If no sufficient system pressure has been or can be built up, step 14 is repeated and a signal is generated to the effect that the operation of the auxiliary aggregate is not permitted. That signal, or the cancellation of the confirmation signal, can be supplemented by the information that the system pressure could not be built up.

If a sufficient system pressure is built up, the process moves on to step 20. In step 20, the confirmation signal is produced to show that the actuation of the power take-off clutch is permitted. For this, the transmission control unit can send the confirmation signal to a clutch control unit, for example via the CAN bus. The confirmation signal can be a change of a variable in the software, for example from zero to one. If the confirmation signal is cancelled, the value of the variable can then be correspondingly restored to zero.

After the confirmation signal has been produced in step 20, in step 22 it can be checked after a predetermined time interval whether the power take-off clutch has been engaged and the power take-off coupled thereby. For this, a corresponding signal can be received by the control unit via the CAN bus. If the power take-off has not been coupled, then in step 24, the system pressure is reduced, for example, to its initial value before passing through step 16. In addition, step 14 is carried out again in order to cancel the confirmation signal. This can be supplemented with the information that the power take-off has not been coupled within the predetermined time interval.

Step 26 relates to the case when, after step 20, the power take-off has been coupled. This can be notified to the transmission control unit by way of the CAN bus. Now, in step 28, it is checked quasi-continuously, continuously or intermittently whether the respective boundary conditions for operating the power take-off or for the power take-off to be coupled are fulfilled. In this, the boundary conditions can be the same as for the check in step 12 with the same or different values, or they can be different boundary conditions. If the required boundary conditions are still fulfilled, the confirmation signal is maintained. This is indicated by the arrow leading from step 28 to step 20. If the check, in step 28, shows that the boundary conditions are not fulfilled, the confirmation signal is cancelled in accordance with step 14. This can be supplemented with the information that some boundary conditions for coupling the power take-off or for its operation despite the already effected coupling or start of operation, are no longer fulfilled. In reaction to that information, the system pressure can be maintained until the power take-off clutch has been again disengaged. As soon as the confirmation signal has been cancelled and the power take-off clutch has been disengaged, in step 14 the system pressure built up in step 16 can, in contrast, be lowered again, analogously to step 24.

When step 26 of the method has been reached and the power take-off clutch has been engaged so that the power take-off is coupled and in operation, then at least one of steps 30 to 36 can in addition be carried out.

In step 30, in a driving transmission control unit a learning function for an actuation pressure of the shifting elements concerned is deactivated. During the operation of the power take-off, some assumed input torques are often too imprecise to achieve proper fine adjustment with the learning function.

In step 32 a motor control unit is modified by at least one function. For example, new rotation speed limits for the motor can be specified. Alternatively or in addition, new limits for a power take-up at the motor can be specified.

In step 34, a driving transmission control unit is modified in order that at least one shifting element of the driving transmission is actuated with a higher actuation pressure than if the driving transmission control unit had not been modified. An unmodified actuation pressure can already take into account a characteristic of the auxiliary aggregate and alternatively or in addition a take-off capacity drawn by the power take-off, in that the respective loads of the at least one shifting element are designed for a lower pressure. Thanks to the modification, an offset to a higher actuation pressure can be provided in order to take account of uncertainties in a determination of a power take-up by the auxiliary aggregate and to avoid slip at the shifting elements concerned in the driving transmission. In an embodiment the offset can be determined in the form of a current rotation speed of the power take-off and alternatively or in addition a torque of the power take-off, in order to adapt it as closely as possible to requirements.

In step 36, a modified shifting program for the driving transmission is activated. In this, some shifting points at which a gearshift takes place can be modified. For example, the shifting strategy can be adapted so that owing to the coupled power take-off, there are smaller input torques.

In step 38, an input torque can be determined in each case as a function of a power take-off torque characteristic and as a function of converter slip. The calculation of an input torque can thus be modified by taking account of the said power take-off torque characteristic and the slip of said converter and if the torque calculated as a function of the converter slip is smaller, that torque is used for control purposes. The control of the relevant shifting elements of the driving transmission, in particular their actuation pressure, can therefore be achieved as a function of a more precisely calculated input torque.

INDEXES

10 Request to couple the power take-off
12 Checking of boundary conditions
14 Blocking of the operation of the power take-off
16 System pressure build-up
18 Checking the system pressure
20 Production of the confirmation signal
22 Checking whether the power take-off has been coupled
24 Reduction of the system pressure
26 Power take-off has been coupled
28 Further checking of boundary conditions
30 Deactivation of the learning function of the driving transmission control unit
32 Modification of the motor control unit
34 Modification of the respective actuation pressures of the shifting elements of the driving transmission
36 Activation of the modified shifting program
38 Calculation of the input torque as a function of the power take-off torque characteristic and as a function of converter slip

The invention claimed is:

1. A method of operating a motor vehicle with a motor, a driving transmission having at least one shifting element, a power take-off and a power take-off clutch by which the power take-off is coupleable to the driving transmission, the method comprising at least the following steps:
   detecting a request to couple the power take-off;
   checking whether respective boundary conditions for coupling the power take-off are fulfilled;
   when the respective boundary conditions are fulfilled, building-up a system pressure sufficient for actuating the power take-off clutch;
   checking whether a system pressure sufficient for actuating the power take-off clutch has been built up;
   when sufficient system pressure has been built up, producing a confirmation signal that actuation of the power take-off clutch is permitted; and
   modifying a driving transmission control unit in reaction to the confirmation signal, in order to actuate the at least one shifting element of the driving transmission with a higher actuation pressure than with an unmodified driving transmission control unit.

2. The method according to claim 1, further comprising, with the modification of the driving transmission control unit, in addition deactivating a learning function for an actuation pressure when actuating the at least one shifting element of the driving transmission.

3. The method according to claim 1, further comprising, in reaction to the confirmation signal, modifying a motor control unit with at least one of the following functions:
   specification of at least one rotation speed limit for the motor; and
   specification of a limit for the power drawn from the motor.

4. The method according to claim 1, further comprising, along with the modification of the transmission control unit, in addition activating a different shifting program for the driving transmission.

5. The method according to claim 1, further comprising the following steps:
   checking whether the power take-off has been coupled, within a predetermined time interval, after producing the confirmation signal; and
   reducing the system pressure for actuating the power take-off clutch and cancelling the confirmation signal, when the power take-off has not been coupled within the predetermined time interval.

6. The method according to claim 1, further comprising the following steps:
   after the power take-off has been coupled, checking whether the relevant boundary conditions for coupling the power take-off are still fulfilled; and
   while the power take-off is currently coupled, cancelling the confirmation signal when the relevant boundary conditions are no longer fulfilled.

7. The method according to claim 6, further comprising, even after the confirmation signal has been cancelled, maintaining the system pressure for actuating the power take-off clutch at least until the power take-off has been decoupled.

8. The method according to claim 1, further comprising, for the modification of the driving transmission control unit in reaction to the confirmation signal, determining a value for increasing the actuation pressure compared with an unmodified actuation pressure as a function of the following factors:
   a rotation speed applied at the drive input of the driving transmission; and
   a torque applied at the drive input of the driving transmission.

9. The method according to claim 1, further comprising calculating an actual torque at a drive input of the driving transmission as a function of at least one of the following parameters:
   a torque provided at a crankshaft of the motor;
   a consumer loss;
   a motor braking force when driving downhill; and
   a calculated torque applied on the power take-off.

10. The method according to claim 9, further comprising calculating a torque at the power take-off in each case once as a function of a characteristic of the power take-off and once as a function of a converter slip, and when the torque calculated as the function of the converter slip is smaller than the torque calculated as the function of the characteristic of the power take-off, using that torque for control purposes.

11. A control unit designed to carry out the method according to claim 1.

12. A computer program designed to enable a control unit to carry out the method according to claim 1, when the computer program is run on the control unit.

* * * * *